Oct. 21, 1969     S. ROHLIK     3,473,590
CAMERA CASE
Filed June 10, 1968
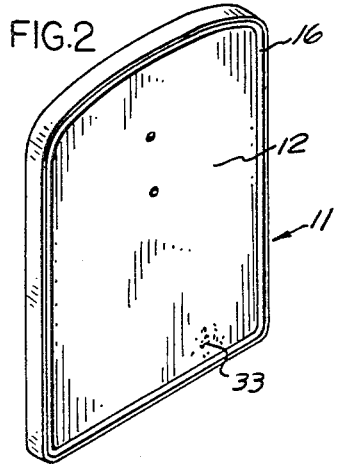
FIG.2
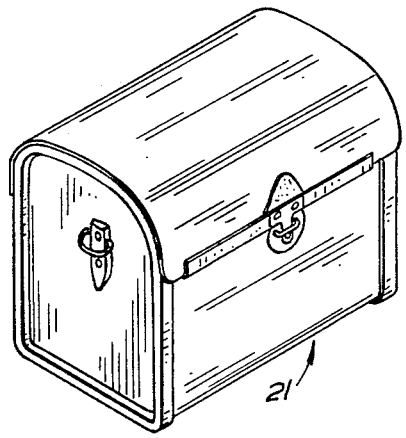
FIG.1
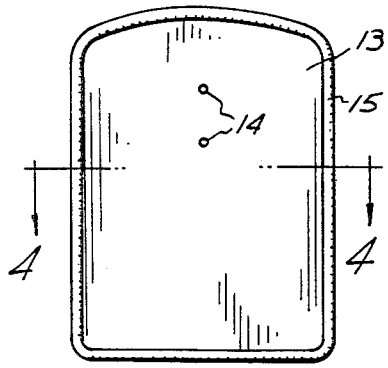
FIG.3
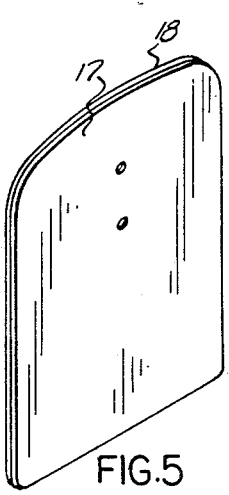
FIG.5
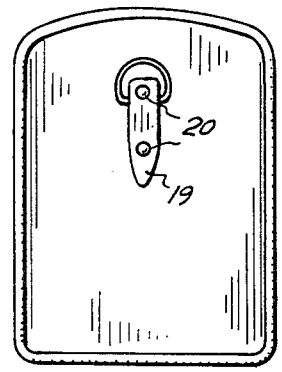
FIG.6
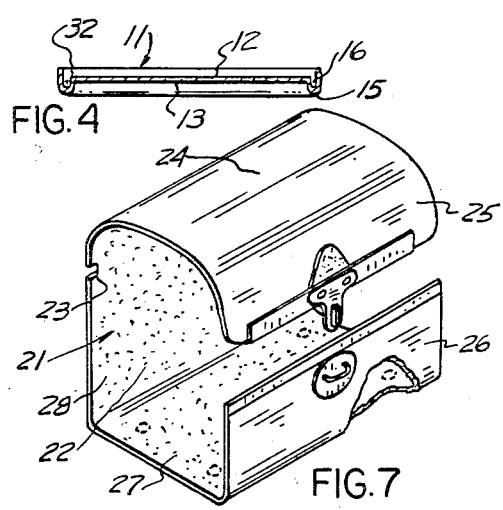
FIG.4
FIG.7
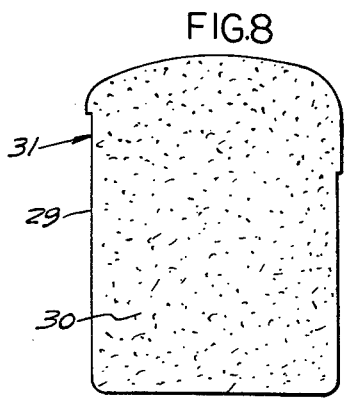
FIG.8
INVENTOR
SIGMUND ROHLIK
BY Cullen, Sloman, & Cantor
ATTORNEYS 3,473,590
CAMERA CASE
Sigmund Rohlik, Southfield, Mich.
(7777 Cortland Ave., Detroit, Mich. 48204)
Filed June 10, 1968, Ser. No. 743,838
Int. Cl. A45c *11/38*
U.S. Cl. 150—52                                                3 Claims

ABSTRACT OF THE DISCLOSURE

A camera case which includes a pair of molded end plates, each having a common depressed inner and outer wall with an exterior bead defining an interior continuous channel, and a body of flexible material formed to define front, bottom and rear walls and top and front flaps, the rear wall being laterally slotted at both ends, the end edges of said walls being projected into and adhesively bonded to said end plate channels, said flaps overlying the upper and adjacent front edges of said end plates; and the novel method of manufacture.

---

Heretofore, in the manufacture of camera cases generally, the end plates employed have been stitched to the body portion. It is an object of the present invention to provide a novel method of manufacture and a novel structure by which all stitching of the camera case or related case is eliminated.

It is another object to provide premolded end plates for the camera case, together with a flexible preformed body and wherein the end edges of the body which define the walls and flaps are of such construction that the ends of the walls project into channels formed in the end plates and are adhesively bonded thereto and with the flap portions of the body overlying upper and front wall portions of the end plates.

It is another object to provide a novel method of manufacture of camera cases and the like, and wherein the respective parts, namely, the end plates and the flexible body are bonded together adhesively eliminating all stitching.

These and other objects will be seen from the following specification and claims in conjunction with the appended drawing in which:

FIG. 1 is a front, perspective view of the present camera case.

FIG. 2 is a perspective view of an end plate.

FIG. 3 is an exterior end elevational view of an end plate.

FIG. 4 is a fragmentary section taken in the direction of arrows 4—4 of FIG. 3.

FIG. 5 is a front perspective view of the ornamental insert for the end plate.

FIG. 6 is a front elevational view of the assembled end plate and ornamental insert.

FIG. 7 is a perspective view on an increased scale of the flexible camera case body.

FIG. 8 is a front elevational view of the end plate liner insert.

Referring to the drawings, the present camera case includes a pair of molded end plates 11 which may be vacuum formed or injection molded. Each end plate has a depressed inner wall 12 and a common but depressed outer wall 13, FIG. 3, apertured at 14.

Referring to FIGS. 3 and 4, each end plate includes the continuous peripheral bead 15 upon its exterior and corresponding thereto upon its interior surface, the peripheral channel 16.

An ornamental insert, FIG. 5, includes a laminate 17 of a wood graining or other ornamental nature, bonded to a suitable backing 18 of cardboard or other material, similarly apertured corresponding to apertures 14, FIG. 3.

Suitable strap mounting hardware 19 is applied to the outer insert 17 with rivets 20 which project through corresponding apertures in insert 17 and end plate 11 to complete the assembly shown in FIG. 6.

The body 21 for the camera case or like case, is constructed of a flexible material such as plastic or leather or imitation leather and for softness may have upon its interior surface a layer of rayon flocking 22. Said body initially rectangular substantially, as shown in FIG. 7 is formed into generally rectangular shape in cross-section to thus define front wall 26, bottom wall 27, rear wall 28, top flap 24 and front flap 25.

At this stage, though forming no part of the present invention, suitable brass trim is applied to the marginal portions of front wall 26 and the adjacent flap and conventional fastening hardware is provided.

The respective end portions of rear wall 28 are laterally slotted as at 23 so that the flaps cooperatively overly and register with the top edge and front portions of the end plates, FIG. 1.

In the assembly of the present camera case an adhesive layer of a suitable plastic cement 32 or an epoxy resin or other adhesive bonding agent is applied to the exterior edges of the body walls 26, 27 and 28. The respective end edges of said walls are then projected respectively into the corresponding adjacent channel portion 16 of the said end plates permitted to bond thereto making a permanent joint or seal.

At the point where the rear wall is laterally slotted the corresponding portions of the top flap extend laterally outward of the respective end plates to cooperatively overly the top and the front flaps, the forward edge portion thereof as shown in FIG. 1.

The construction is completed by the liner insert 29 provided for each of the said end plates which may include upon its interior surface for softness, a layer of rayon flocking 30 as desired. The side walls of the insert 29 at their upper ends are notched as at 31 so as to cooperatively register with the interior surface 12 as the said liner is snugly projected into the assembly snugly bearing against corresponding interior wall portions of the body.

Since a portion of the body, namely the flaps, do not project into the upper portions of the channel 16 of the end plates, the respective upper arcuate portion of the liner inserts 29 including the notched portions 31 fill the remaining space so that when the said liners are projected snugly into position, the interior portion of the camera case is completed.

A layer of a suitable adhesive is applied to the inner surface 12 of each end plate as at 33 so that in the assembled article the liner inserts are bonded and secured to the respective inner surfaces of the end plates.

The present construction and method forming the camera case or like article, consists of the following steps: (1) molding a pair of end plates 11 so as to have common but depressed inner and outer walls with an exterior peripheral bead and an interior peripheral channel; (2) forming a flexible rectangular body into generally rectangular shape in cross-section to define front, bottom and rear walls and top and front flaps; (3) applying a layer of adhesive to the corresponding end outer edges of the respective walls; (4) snugly nesting said edges with adhesive into the end plate channels and bonding said body and end plates together.

There is provided the further step of applying ornamental wood grain laminate to the exterior surface portion of the end plate within the bead.

There is a further step of providing a liner insert to be snugly interposed between the inner walls of the body projected into and against the depressed inner wall of the respective end plates, frictionally therein and bonded thereto.

Having described my invention, reference should now be had to the following claims.

I claim:
1. A camera case comprising a pair of end plates, each having an exterior peripheral bead defining a depressed outer wall and a depressed common inner wall bounded by a continuous channel;
   a body of flexible material generally of rectangular shape in cross-section defining front, bottom and rear walls, and top and front flaps;
   said rear wall being laterally slotted at both ends;
   the edges of said walls being snugly nested into the channels of said end plates;
   an adhesive layer bonding said edges within said end plate channels;
   said flaps overlying the upper and adjacent front edges of said end plates.

2. In the camera case of claim 1, and a decorative insert mounted upon each end plate outer wall and snugly nested within said bead; and fastening means interconnecting said insert and end plate.

3. In the camera case of claim 2, and a liner insert mounted upon said end plate inner wall snugly interposed between said body walls;
   and an adhesive layer bonding said liners to said end plates.

References Cited
UNITED STATES PATENTS

| 1,801,443 | 4/1931 | Mesinger | 150—52 X |
| 2,707,506 | 5/1955 | Kontoff et al. | |
| 2,827,095 | 3/1958 | Hepting. | |

FOREIGN PATENTS 1,267,788  6/1961  France.

DONALD F. NORTON, Primary Examiner

U.S. Cl. X.R.

150—28, 46; 190—48, 54